(12) United States Patent
Zeng et al.

(10) Patent No.: US 12,208,650 B2
(45) Date of Patent: Jan. 28, 2025

(54) WHEEL POSITIONING METHOD, SYSTEM, ELECTRONIC CONTROL UNIT AND TIRE PRESSURE SENSOR

(71) Applicant: AUTEL INTELLIGENT TECHNOLOGY CORP., LTD., Guangdong (CN)

(72) Inventors: Feng Zeng, Guangdong (CN); Yongliang Luo, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 374 days.

(21) Appl. No.: 17/806,551

(22) Filed: Jun. 13, 2022

(65) Prior Publication Data
US 2022/0314714 A1    Oct. 6, 2022

Related U.S. Application Data

(63) Continuation of application No. PCT/CN2020/133778, filed on Dec. 4, 2020.

(30) Foreign Application Priority Data

Dec. 27, 2019  (CN) .......................... 201911379478.9

(51) Int. Cl.
*B60C 23/04*   (2006.01)
(52) U.S. Cl.
CPC ............................... *B60C 23/0488* (2013.01)

(58) Field of Classification Search
None
See application file for complete search history.

(56) References Cited

U.S. PATENT DOCUMENTS

| | | | |
|---|---|---|---|
| 8,903,602 B2 | 12/2014 | Bailie et al. | |
| 10,525,779 B2 | 1/2020 | Tsujita | |
| 2011/0071737 A1 | 3/2011 | Greer et al. | |
| 2012/0029767 A1 | 2/2012 | Bailie et al. | |
| 2014/0148990 A1* | 5/2014 | Fink | B60C 23/0489 701/29.4 |

(Continued)

FOREIGN PATENT DOCUMENTS

| | | |
|---|---|---|
| CN | 102133843 A | 7/2011 |
| CN | 102686417 A | 9/2012 |

(Continued)

OTHER PUBLICATIONS

International search report mailed Mar. 3, 2021 PCT/CN2020/133778 with English Translation.

(Continued)

*Primary Examiner* — Justin S Lee
(74) *Attorney, Agent, or Firm* — Frank Gao, Esq.

(57) ABSTRACT

The present application relates to the technical field of automobile wheel positioning, and more particularly to a wheel positioning method, a system and an electronic control unit and a tire pressure sensor. The system comprises an electronic control unit, a tire pressure sensor and an ABS sensor. Embodiments of the present application provide the wheel positioning method, the system, the electronic control unit, and the tire pressure sensors to improve the accuracy of wheel positioning.

14 Claims, 9 Drawing Sheets

(56) References Cited

U.S. PATENT DOCUMENTS

| | | |
|---|---|---|
| 2015/0057876 A1 | 2/2015 | Graham et al. |
| 2016/0059646 A1* | 3/2016 | Cimponeriu ........ B60C 23/0416 73/115.07 |
| 2018/0257441 A1* | 9/2018 | Maehara ............. B60C 23/0489 |
| 2019/0070908 A1 | 3/2019 | Tsujita |
| 2019/0299725 A1* | 10/2019 | Maehara ............. B60C 23/0416 |
| 2020/0116469 A1 | 4/2020 | Lin |

FOREIGN PATENT DOCUMENTS

| | | | |
|---|---|---|---|
| CN | 107471928 A | | 12/2017 |
| CN | 109153297 A | | 1/2019 |
| CN | 109383201 A | | 2/2019 |
| CN | 109664691 A | | 4/2019 |
| CN | 109986916 A | | 7/2019 |
| CN | 111016553 A | | 4/2020 |
| EP | 3418079 A1 | | 12/2018 |
| JP | 6700386 B2 | | 5/2020 |
| KR | 20130130878 A | * | 12/2013 |
| KR | 20150022448 A | * | 3/2015 |
| KR | 20180135849 A | | 12/2018 |
| KR | 20190054276 A | | 5/2019 |
| WO | WO2012013726 A1 | | 2/2012 |
| WO | WO-2012157306 A1 * | 11/2012 ............. B60C 23/02 |
| WO | WO2018198271 A1 | | 11/2018 |

OTHER PUBLICATIONS

First Chinese Office Action dated Feb. 2, 2021; Appln. No. 201911379478.9.

* cited by examiner

TPMS ECU takes received N1 as an opportunity to read ABS gear data

When TPMS ECU receives N2, it automatically subtracts the frame interval time of T1, and reads the ABS gear data at the time of N1 frame

WHEEL POSITIONING METHOD, SYSTEM, ELECTRONIC CONTROL UNIT AND TIRE PRESSURE SENSOR

CROSS REFERENCE TO RELATED APPLICATIONS

This application is continuation application of International Application No. PCT/CN2020/133778, filed on Dec. 4, 2020, which claims priority to Chinese Patent Application No. 201911379478.9, filed to China Patent Office on Dec. 27, 2019, the entire contents of which are incorporated herein by reference.

BACKGROUND

Technical Field

The present application relates to the technical field of automobile wheel positioning, and more particularly to a wheel positioning method, a system, an electronic control unit and a tire pressure sensor.

Related Art

By the wireless transmission technology, Tire Pressure Monitoring System (TPMS) uses a high-sensitivity miniature wireless sensor device fixed in the automobile tire to monitor the pressure, temperature and other parameters of the automobile tire in real-time under driving or stationary state, so as to ensure that the pressure and temperature of the tire are maintained within the standard range, decrease the probability of tire burst and damage, and reduce fuel consumption and automobile component damage.

However, it is particularly important to re-accurately determine the position of the tires after daily tire replacement so that the tire pressure conditions of the respective tires can be monitored to ensure safe driving of the automobile.

At present, the positioning of tires in the prior art is usually based on the received signal strength of a sensor in the tires. This method has a high requirement for the antenna consistency of the sensor and the receiver. It is liable to cause positioning errors when the antenna performance changes.

SUMMARY

The technical problem to be solved by the present application is to provide a wheel positioning method, a system, electronic control unit, and a tire pressure sensor to solve the technical problem of low accuracy in wheel positioning.

In a first aspect, an embodiment of the present application provides a wheel positioning method applied to an electronic control unit mounted to an automobile, each wheel of which is provided with a tire pressure sensor and an ABS sensor, and the method includes:
 receiving RF data from a tire pressure sensor, wherein the RF data is transmitted when a rotation angle of the tire pressure sensor is at a target angle, and the RF data includes a rotation period of the tire pressure sensor;
 acquiring gear pulse information transmitted by the ABS sensor of each wheel of the automobile, wherein the gear pulse information and the RF data are used to represent information of the wheel at approximately the same time;
 determining a rotation period of the wheel of the automobile from the gear pulse information of any one of the ABS sensors of each wheel;
 judging whether a difference value between the rotation period of the tire pressure sensor and the rotation period of the automobile wheel is within a preset range; and
 if the difference value between the rotation period of the tire pressure sensor and the rotation period of the automobile wheel is within the preset range, determining a target ABS sensor mounted to the same wheel as the tire pressure sensor to determine the position of the same wheel based on the position of the target ABS sensor.

Optionally, the electronic control unit comprises a tire pressure ECU and an ABS control unit; the ABS control unit is connected to the tire pressure ECU and the ABS sensor, respectively; and
 the determining a rotation period of the wheel of the automobile from the gear pulse information of any one of the ABS sensors of each wheel includes:
 acquiring a rotation period of the wheel of the automobile by the ABS control unit, wherein the rotation period of the wheel is calculated by the ABS control unit based on the gear pulse information of any one of the ABS sensors of each wheel; or
 acquiring by the tire pressure ECU the gear pulse information of any one of the ABS sensors of each wheel via the ABS control unit, and calculating the rotation period of the wheel of the automobile according to the gear pulse information.

Optionally, the gear pulse information comprises a gear scale, and the calculating the rotation period of the wheel of the automobile according to the gear pulse information includes:
 acquiring all gear scale information corresponding to a preset sampling depth, wherein the all gear scale information includes each collected gear scale and a sampling time corresponding to each gear scale;
 acquiring a currently collected gear scale and a first sampling time;
 according to the currently collected gear scale, querying the all gear scale information for a second sampling time corresponding to the same gear scale as the currently collected gear scale; and
 calculating the rotation period of the wheel according to the first sampling time and the second sampling time.

Optionally, the judging whether a difference value between the rotation period of the tire pressure sensor and the rotation period of the automobile wheel is within a preset range includes:
 when the difference value between the rotation period of the tire pressure sensor and the rotation period of the automobile wheel is zero, determining it to be within the preset range, otherwise, not within the preset range.

Optionally, the method further includes:
 when a data frame is lost in the received RF data, synchronously matching the obtained gear pulse information according to the lost data frame, so that the time when the gear pulse information is obtained matches the time when the RF data is received.

In a second aspect, an embodiment of the present application provides a wheel positioning method applied to a tire pressure sensor, the method including:
 acquiring a rotation angle of the tire pressure sensor;
 determining a rotation period of the tire pressure sensor;
 transmitting RF data including a rotation period of the tire pressure sensor to an electronic control unit when the rotation angle is a preset target angle, wherein the RF data includes the rotation period of the tire pressure sensor; the rotation period is used for the electronic control unit to judge whether a difference value between the rotation period of the tire pressure sensor and the rotation period of the wheel is within a preset range; and if the difference value between the rotation period of the tire pressure sensor and the rotation period of the wheel is within the preset range, determining the position of the wheel where the tire pressure sensor is located.

Optionally, the determining a rotation period of the tire pressure sensor includes:

calculating a rotation period of the tire pressure sensor according to a formula $$T = 2\pi\sqrt{\frac{R}{Acc}},$$

wherein T is the rotation period of the tire pressure sensor, R is a wheel radius, and Acc is a centripetal acceleration detected by the tire pressure sensor; or determining a detection time point when the rotation angle of the tire pressure sensor is 0 degrees and a detection time point corresponding to 360 degrees when the tire pressure sensor rotates from 0 degrees to 360 degrees, and calculating the rotation period of the tire pressure sensor according to the detection time point corresponding to 0 degrees and the detection time point corresponding to 360 degrees.

Optionally, before the step of acquiring a rotation angle of the tire pressure sensor, the method further includes:

waking up the tire pressure sensor periodically, and acquiring the rotation angle of the tire pressure sensor when the tire pressure sensor is in a wake-up state.

Optionally, the acquiring a rotation angle of the tire pressure sensor includes:

obtaining the rotation angle of the tire pressure sensor according to a gravitational acceleration component of the tire pressure sensor in the X axis or the Z axis.

Optionally, the obtaining the rotation angle of the tire pressure sensor according to a gravitational acceleration component of the tire pressure sensor in the X axis or the Z axis includes:

acquiring a waveform of an X-axis gravitational acceleration component or a waveform of a Z-axis gravitational acceleration component of the tire pressure sensor.

performing filtering processing on the obtained waveform;

calculating a sampling rate of the X-axis gravitational acceleration component or the Z-axis gravitational acceleration component after performing filtering processing, wherein the sampling rate is used for sampling the X-axis gravitational acceleration component or the Z-axis gravitational acceleration component;

converting the sampled X-axis gravitational acceleration component or the sampled Z-axis gravitational acceleration component into a rotation angle of the tire pressure sensor.

Optionally, the performing filtering processing on the obtained waveform includes:

filtering out gravitational acceleration components that exceed upper and/or lower limits to obtain a filtered first waveform; and performing small-amplitude acceleration noise filtering processing on the first waveform.

Optionally, the calculating a sampling rate of the X-axis gravitational acceleration component or the Z-axis gravitational acceleration component after performing filtering processing includes:

calculating a sampling rate of the X-axis gravitational acceleration component or the Z-axis gravitational acceleration component according to the formula: fsample=360°/(a*Tcircle), wherein fsample is a sampling rate, a is a maximum angular deviation value allowed for measurement, and Tcircle is a wheel rotation period.

Optionally, the method further includes:

acquiring real-time parameters of the automobile tire;
adjusting the sampling rate according to the real-time parameter; and
acquiring a rotation angle of the tire pressure sensor according to the adjusted sampling rate.

Optionally, the method further includes:

judging whether a detection time of the tire pressure sensor is greater than a preset time when the rotation angle is not the preset target angle;

if the detection time of the tire pressure sensor is not greater than the preset time, executing the step of acquiring the rotation angle of the tire pressure sensor again; and if the detection time of the tire pressure sensor is greater than the preset time, controlling the tire pressure sensor to be in a dormant state.

In a third aspect, an embodiment of the present application provides an electronic control unit including: at least one processor; and a memory communicatively connected to the at least one processor; wherein the memory stores instructions executable by the at least one processor to enable the at least one processor to perform the wheel positioning method applied to the electronic control unit as described above.

In a fourth aspect, an embodiment of the present application provides a tire pressure sensor including: at least one processor; and a memory communicatively connected to the at least one processor; wherein the memory stores instructions executable by the at least one processor to enable the at least one processor to perform the wheel positioning method applied to a tire pressure sensor as described above.

In a fifth aspect, an embodiment of the application provides a wheel positioning system including: an electronic control unit, a tire pressure sensor and an ABS sensor, wherein the electronic control unit is respectively connected to the tire pressure sensor and the ABS sensor;

The electronic control unit is configured for:

receiving RF data transmitted by the tire pressure sensor, the RF data including a rotation period of the tire pressure sensor; acquiring gear pulse information transmitted by the ABS sensor; determining a rotation period of an automobile wheel according to the gear pulse information; determining whether a difference value between a rotation period of the tire pressure sensor and the rotation period of the automobile wheel is within a preset range;

if the difference value between a rotation period of the tire pressure sensor and the rotation period of the automobile wheel is within the preset range, determining a target ABS sensor mounted to the same wheel as the tire pressure sensor to determine the position of the same wheel based on the position of the target ABS sensor;

The tire pressure sensor is configured for:
acquiring a rotation angle of the tire pressure sensor;
judging whether the rotation angle is a preset target angle;
if the rotation angle is the preset target angle, transmitting RF data to the electronic control unit, wherein the RF data includes the rotation period of the tire pressure sensor;

The ABS sensor is configured for:
acquiring gear pulse information of the automobile wheel, and transmitting the gear pulse information to the electronic control unit.

Different from the prior art, the embodiments of the present application provide a wheel positioning method, a system, an electronic control unit and a tire pressure sensor. It transmits RF data when the tire pressure sensor rotates to a preset target angle, the RF data including a rotation period of the tire pressure sensor; and at the same time, it acquires gear pulse information of an automobile wheel via an ABS sensor, and obtains the rotation period of the automobile wheel according to the gear pulse information. It determines the target ABS sensor mounted on the same wheel as the tire pressure sensor according to the tire pressure sensor only when the difference value between the rotation period of the tire pressure sensor and the rotation period of the automobile wheel is within a preset range, thereby determining the position of the same wheel according to the target ABS sensor. The other wheels of the automobile may also perform the wheel positioning in the manner described above. Embodiments of the present application provide the wheel positioning method, the system, the electronic control unit, and the tire pressure sensors to improve the accuracy of wheel positioning.

BRIEF DESCRIPTION OF THE DRAWINGS

One or more embodiments are exemplified by the pictures in the accompanying drawings corresponding to them. These illustrative description does not constitute a limitation for embodiments. Those elements with the same reference numerals in the accompanying drawings are represented as similar elements, and the figurers in the accompanying drawings do not constitute a proportion limitation unless otherwise stated.

DETAILED DESCRIPTION

In order that the objects, aspects and advantages of the present application will become more apparent, the present application will now be described in further detail with reference to the accompanying drawings and embodiments. It should be understood that the particular embodiments described herein are illustrative only and are not limiting.

It will be appreciated that various features of the embodiments of the application can be combined with one another without departing from the scope of the application. In addition, although the division of functional blocks is illustrated in a schematic diagram of an apparatus and a logical order is illustrated in a flowchart, in some cases, it can be different from the division of functional blocks in the apparatus schematic diagram; or the steps shown or described may be performed other than that shown in the sequence of the flow chart.

Figure 1:
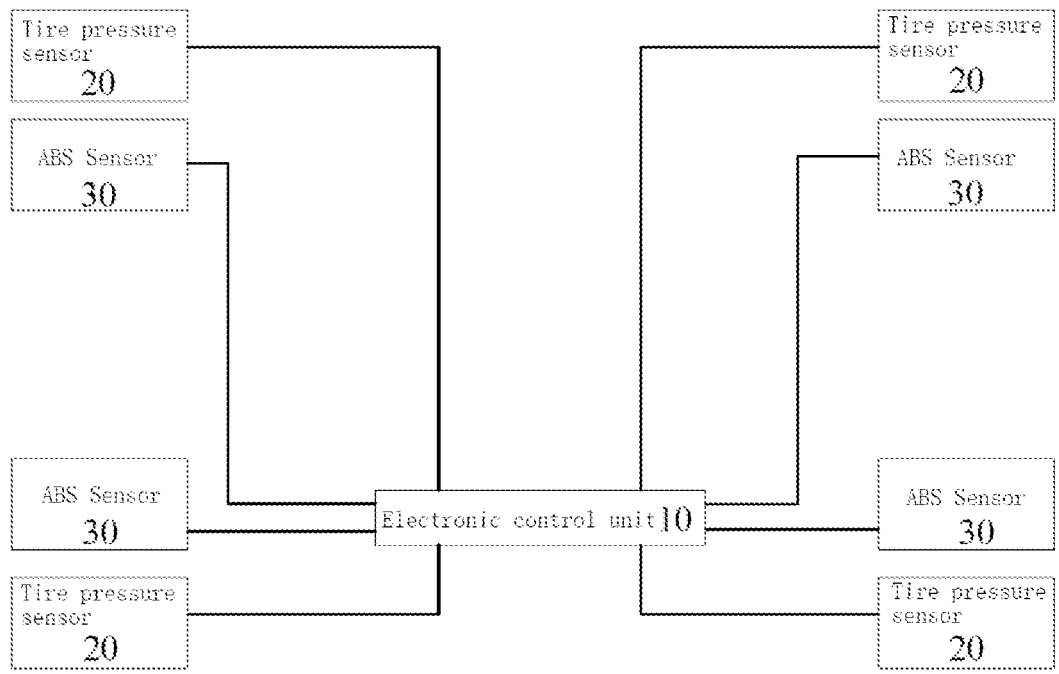
FIG. 1 is a structurally schematic diagram of a wheel positioning system according to an embodiment of the present application.

Referring to FIG. 1, it is a structurally schematic diagram of a wheel positioning system according to an embodiment of the present application. The system 100 includes an electronic control unit 10, a tire pressure sensor 20, and an ABS sensor 30. Herein, the electronic control unit 10 is connected to the tire pressure sensor 20 and the ABS sensor 30, respectively.

In the present embodiment, the positioning principle of the wheel positioning system 100 mainly includes that the tire pressure sensor 20 transmits an RF signal at one or more specific angles; after the electronic control unit 10 receives the RF signal, the electronic control unit 10 acquires information about a rotation period, a rotation angle, a tire pressure, a tire temperature, a sensor ID, etc. of the tire pressure sensor 20 from the RF signal. Meanwhile, the electronic control unit 10 acquires wheel gear pulse information from the ABS sensor 30, and calculates a rotation period of the automobile wheel according to the gear pulse information. Since the tire pressure sensor 20 rotates integrally with the wheel at its corresponding position, the rotation period of the tire pressure sensor 20 is generally the same as or similar to the rotation period of the automobile wheel detected in real time. Therefore, when the rotation period of the tire pressure sensor 20 is the same as or similar to the rotation period of the wheel of the automobile obtained from the ABS sensor 30, a target ABS sensor mounted on the same wheel as the tire pressure sensor is determined to determine the position of the same wheel from the position of the target ABS sensor.

The various modules in the system 100 are described in detail below based on the positioning principles of the wheel positioning system 100 described above.

Figure 2:
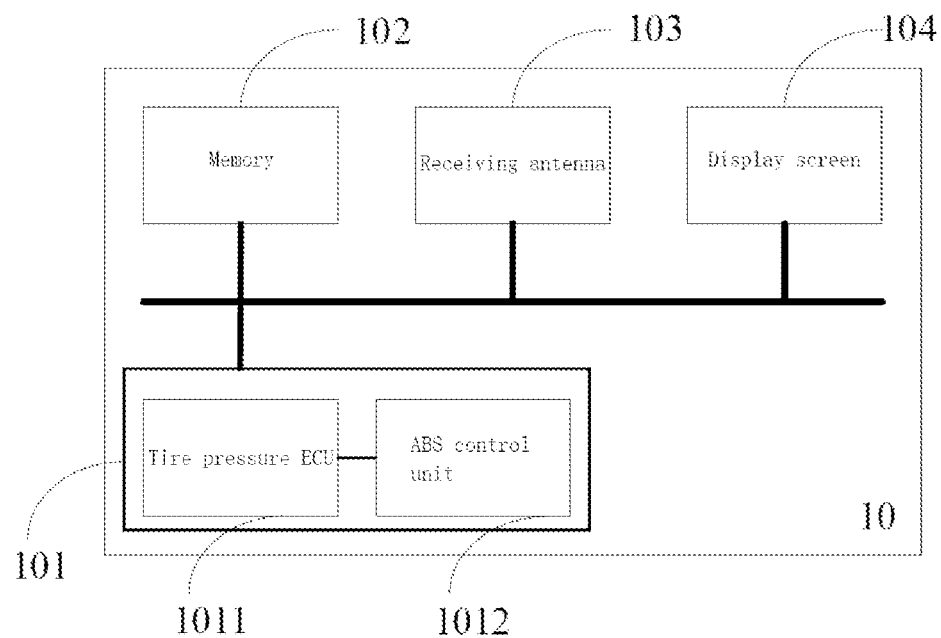
FIG. 2 is a structural block diagram of an electronic control unit of FIG. 1.

Referring to FIG. 2, it is a structural block diagram of an electronic control unit 10. The electronic control unit 10 may include a processor 101, a memory 102, a receiving antenna 103 and a display screen 104.

The processor 101, the memory 102, the receiving antenna 103 and the display screen 104 establish a communication connection therebetween by means of a bus or other connection.

The processor 101 is any type of single-threaded or multi-threaded processor having one or more processing cores as a control core of the electronic control unit 10 for acquiring data, performing a logical operation function and issuing an operation processing result. The processors 101 may be one or more, one processor 101 being exemplified in FIG. 2.

In the present embodiment, the processor 101 includes a tire pressure electronic control unit (ECU) 1011 and an ABS control unit 1012. The tire pressure ECU 1011 can serve as a control core of the processor 101, and is used for acquiring data, performing a logical operation function and issuing an operation processing result. For example, the tire pressure ECU 1011 can obtain gear pulse information detected by the ABS sensor via an ABS control unit 1012, and calculate a rotation period, a rotation angle and the like of the automobile wheel according to the gear pulse information. The ABS control unit 1012 is one of the components of an automobile Anti-lock Braking System (ABS). The basic operating principle of the ABS system is as follows: the wheel speed signals of the four wheels are collected by the rotation speed sensors mounted on the wheels and transmitted to the ABS control unit 1012 to calculate the wheel speed of each wheel, and then calculate the deceleration of the automobile and the slip ratio of the wheels. In the present embodiment, the ABS control unit 1012 is configured to acquire gear pulse information of the wheels of the automobile from the ABS sensor 30 and transmit the gear pulse information to the tire pressure ECU 1011. The ABS control unit 1012 is further configured to calculate the rotation period of the automobile wheel according to the gear pulse information obtained from the ABS sensor 30 and transmit the rotation period of the automobile wheel to the tire pressure ECU 1011.

Herein, the gear pulse information is used for indicating a relative rotational position of the wheel, which includes the obtained number of edges of the current tooth or teeth number of the ABS gear. It will be appreciated that the wheels typically have a total of 48 ABS gears, plus the clearance between the gears, which can be approximated as a total of 96 equally divided scales, each corresponding to an angle of 360/96=3.75 degrees. The ABS control unit 1012 may calculate the rotation angle and rotation period of the wheel according to the gear scale.

The memory 102 serves as a non-volatile computer-readable storage medium such as at least one disk storage device, a flash memory device, a distributed storage device remotely located with respect to the processor 101, or other non-volatile solid-state storage devices. The memory 102 may have a program storage area to store non-volatile software programs, non-volatile computer-executable programs, and modules for invocation by processor 101 to cause the processor 101 to perform one or more method steps, for example, to perform the method steps shown in FIG. 4. The memory 102 may also have a data storage area for storing the result of the operation processing output by the processor 101.

The receiving antenna 103 is configured to receive the RF data transmitted by the tire pressure sensor 20 and transmit the RF data to the processor 101, so that the processor 101 executes a corresponding control instruction according to the RF data. The receiving antenna 103 may be an RF antenna.

The display screen 104 is an output device for presenting corresponding data to a user in a particular form. It may be any type of display, such as a LED display, a picture tube display or an LCD display. The display screen 104 receives display information output by the processor 101 and is accordingly converted into image information to be provided to the user. For example, the display screen 104 may display wheel positioning result information, pressure information, temperature information, etc., so that a user can intuitively understand information about each tire through the display screen 104.

It should be noted that FIG. 2 is merely an example of the electronic control unit 10 and is not intended to limit the structure of the tire pressure sensor 20.

During the wheel positioning, the tire pressure ECU 1011 acquires RF data transmitted from the tire pressure sensor 20 via the receiving antenna 103, and acquires a rotation period of the tire pressure sensor 20 according to the RF data. The tire pressure ECU 1011 is further configured to obtain the current rotation period of the automobile wheel from the ABS control unit 1012. Herein, the current rotation period of the automobile wheel can be calculated by the ABS control unit 1012 according to the gear pulse information collected by the ABS sensor 30 to obtain the rotation period, and the ABS control unit 1012 transmits the rotation period to the tire pressure ECU 1011. The current rotation period of the automobile wheel may also be that the tire pressure ECU 1011 acquires the gear pulse information collected by the ABS sensor 30 via the ABS control unit 1012, and then the current rotation period of the automobile wheel is calculated according to the gear pulse information. After obtaining the rotation period of the tire pressure sensor 20 and the current rotation period of the automobile wheel, the tire pressure ECU 1011 is configured to judge whether a difference value between the rotation period of the tire pressure sensor 20 and the current rotation period of the automobile wheel is within a preset range; if the difference value is within the preset range, a target ABS sensor mounted to the same wheel as the tire pressure sensor 20 is determined to determine the position of the same wheel based on the position of the target ABS sensor. After determining the ABS sensor corresponding to the wheel, the positioning of the automobile wheel can be completed according to the ABS sensor. Similarly, other wheels of the automobile may be positioned according to the method described above, wherein each wheel is provided with a tire pressure sensor 20 and an ABS sensor 30.

Figure 3:
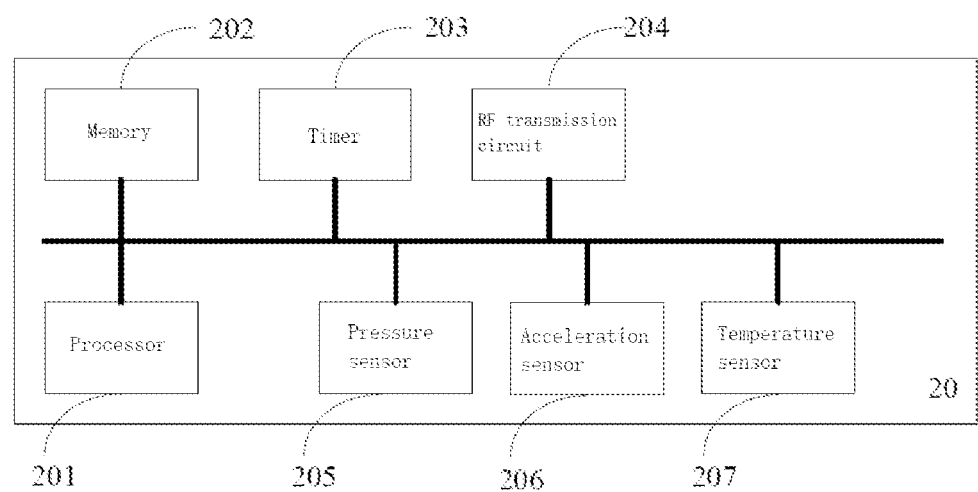
FIG. 3 is a structural block diagram of a tire pressure sensor of FIG. 1.

Referring to FIG. 3, it is a block diagram of the tire pressure sensor 20. The tire pressure sensor 20 may include a processor 201, a memory 202, a timer 203, an RF transmission circuit 204, a pressure sensor 205, an acceleration sensor 206, and a temperature sensor 207.

The processor 201 may establish a communication connection among the memory 202, the timer 203, the RF transmission circuit 204, the pressure sensor 205, the acceleration sensor 206, and the temperature sensor 207, respectively, via a bus or other connection.

The processor 201 is any type of single-threaded or multi-threaded processor having one or more processing cores as a control core of the tire pressure sensor 20 for acquiring data, performing a logical operation function and issuing an operation processing result. The processors 201 may be one or more, one processor 201 being exemplified in FIG. 3.

The memory 202 serves as a non-volatile computer-readable storage medium such as at least one disk storage device, a flash memory device, a distributed storage device remotely located with respect to the processor 201, or other non-volatile solid-state storage devices. The memory 202 may have a program storage area for storing non-volatile software programs, non-volatile computer-executable programs, and modules for invocation by processor 201 to cause processor 201 to perform one or more method steps, for example, to perform the method steps shown in FIGS. 5 and 6. The memory 202 may also have a data storage area for storing the result of the operation processing output by the processor 201.

The timer 203 is configured to periodically wake up the tire pressure sensor 20. When the tire pressure sensor 20 is in a wake-up state, it is in an operating state; and when the tire pressure sensor 20 is not operating, it is in a dormant state. The tire pressure sensor 20 may be powered by a button battery, and the wake-up period of the timer 203 may be set according to a relevant parameter of the button battery.

The RF transmission circuit 204 is configured to transmit the RF data signal collected by the tire pressure sensor 20.

The pressure sensor 205, the acceleration sensor 206 and the temperature sensor 207 are respectively configured to collect pressure, acceleration and temperature data of the automobile tire.

It should be noted that FIG. 3 is merely an example of the tire pressure sensor 20, and is not intended to limit the structure of the tire pressure sensor 20.

In the present embodiment, the tire pressure sensor 20 is configured to transmit an RF data signal outwardly when the rotation angle of the tire pressure sensor is a preset target angle. Specifically, the processor 201 is configured to acquire a rotation angle of the tire pressure sensor 20, and judge whether the rotation angle is a preset target angle. If the rotation angle is the preset target angle, the processor 201 transmits the RF data to the electronic control unit 10. Herein, the memory 202 can store the currently collected rotation angle information about the tire pressure sensor 20, and store the preset target angle, etc.

The tire pressure sensor 20 may include a plurality of sensors respectively provided at positions corresponding to each tire of an automobile tire. When the automobile is provided with a spare tire, a corresponding tire pressure sensor 20 may also be provided for the spare tire.

The ABS sensor 30 is one of the components of an anti-lock braking system of the automobile. The ABS sensor 30 may be mounted at a corresponding position of a wheel of the automobile, and the ABS sensor 30 may include a plurality of sensors, for example, an ABS sensor 30 corresponding to a front left wheel of the automobile, an ABS sensor 30 corresponding to a front right wheel of the automobile, an ABS sensor 30 corresponding to a rear left wheel of the automobile and an ABS sensor 30 corresponding to a rear right wheel of the automobile. The ABS sensor 30 may be used to collect wheel speed signals, gear pulse information, etc. of the wheel and transmit the wheel speed signals, gear pulse information, etc. to the ABS control unit 1012.

Embodiments of the present application provide a wheel positioning system that can use the existing ABS sensors 30 to position automobile tires, reducing automobile costs. No additional matching tools are required during the wheel positioning, reducing the threshold for wheel positioning. In addition, a step of judging a rotation period of a tire pressure sensor 20 and a real-time rotation period of an automobile wheel is added during positioning. Only when these two rotation periods satisfy a preset condition, a corresponding ABS sensor 30 thereof is determined according to the tire pressure sensor 20 so as to detect the position of the automobile wheel according to the determined ABS sensor 30. The system can ensure the accuracy of the measurement results, and prevent the pulse counting from still being performed in case the measurement algorithm of the sensor fails or the measurement conditions are not met, resulting in positioning errors. The system improves the accuracy of wheel positioning.

It should be noted that, the wheel positioning system 100 performs the wheel positioning method provided by the embodiment of the present application, and has functional modules and advantageous effects corresponding to the performance of the method. Technical details not described in detail in the embodiment of the present wheel positioning system 100, which may be referred to the wheel positioning method provided in the following embodiment.

Figure 4:
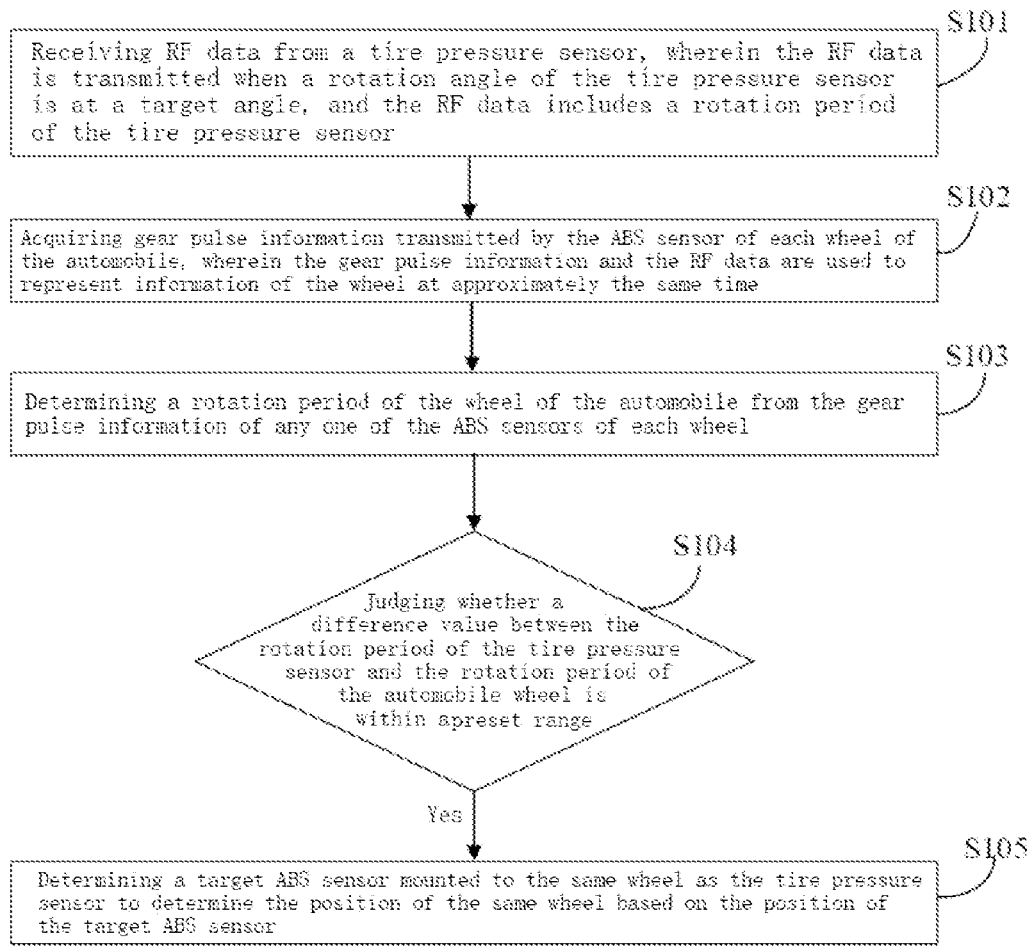
FIG. 4 is a flowchart of a wheel positioning method provided by an embodiment of the present application.

Referring to FIG. 4, it is a flowchart of a wheel positioning method provided by an embodiment of the present application. The method may be applied to the electronic control unit 10 described above, which may be mounted on an automobile including a left front wheel, a right front wheel, a left rear wheel and a right rear wheel, each wheel being provided with a tire pressure sensor 20 and an ABS sensor 30. As shown in FIG. 4, the method includes:

S101, receiving RF data from a tire pressure sensor, wherein the RF data is transmitted when a rotation angle of the tire pressure sensor 20 is at a target angle, and the RF data includes a rotation period of the tire pressure sensor 20.

Herein, the RF data is data detected by the tire pressure sensor 20. The RF data may further include a rotation angle of the tire pressure sensor 20 and a sensor ID which is used for identifying the tire pressure sensor 20. The RF data may further include information on tire pressure, temperature, etc. of the tire detected by the tire pressure sensor 20. For example, the RF data may be represented as:

| Synchronous head | Sensor ID | Pressure | Temperature | Rotation angle information | Frame number | Rotation period |
|---|---|---|---|---|---|---|

Figure 8:
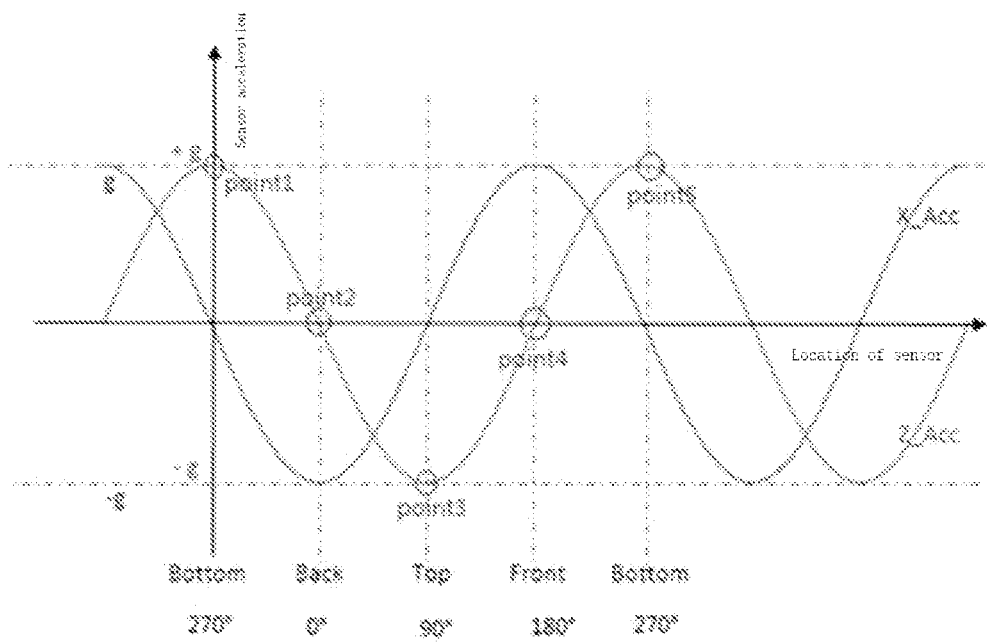
FIG. 8 is a schematic diagram of a variation process of a tire pressure sensor gravitational acceleration component in the x-axis and the z-axis according to an embodiment of the present application.

Herein, the rotation angle of the tire pressure sensor 20 refers to angle information corresponding to the position of the tire pressure sensor 20 collected at a certain sampling moment. For example, as shown in FIG. 8, when the tire pressure sensor (point1) point is located at the Bottom position, the corresponding rotation angle is 270 degrees.

The rotation period of the tire pressure sensor 20 refers to the time difference between passing any two points that differ by 360 degrees. The rotation period of the tire pressure sensor 20 may be obtained according to the following modes.

Mode 1: calculating the rotation period of the tire pressure sensor 20 according to the formula $$T = 2\pi \sqrt{\frac{R}{Acc}},$$

where T is the rotation period of the tire pressure sensor 20, R is the wheel radius, and Acc is the centripetal acceleration detected by the tire pressure sensor 20.

Mode 2: determining a detection time point when the rotation angle of the tire pressure sensor 20 is 0 degrees and a detection time point corresponding to 360 degrees when the tire pressure sensor 20 rotates from 0 degrees to 360 degrees, and calculating the rotation period of the tire pressure sensor according to the detection time point corresponding to 0 degrees and the detection time point corresponding to 360 degrees. Note that, in addition to calculating the rotation period of the tire pressure sensor 20 based on the time taken for the tire pressure sensor to rotate from 0 degrees to 360 degrees, the rotation period of the tire pressure sensor 20 may be calculated based on the time taken for the tire pressure sensor 20 to rotate from N degrees to the next N degrees, where N is any angle between 0 degrees and 360 degrees.

Of course, in practice, the rotation period of the tire pressure sensor 20 may be calculated in other ways than the above two ways.

The target angle may be preset, and there is no limitation on the specific size of the target angle. It is only necessary to be able to inform the electronic control unit 10 in a specific manner what angle the RF signal is currently received. For example, the tire pressure sensor 20 alternately transmits RF signals at two fixed angles of 0° and 180°, and the odd packet data received by the electronic control unit 10 represents that the tire pressure sensor is at the position of 0°, and the even packet data represents that the tire pressure sensor is at the position of 180°.

S102, acquiring gear pulse information transmitted by the ABS sensor 30 of each wheel of the automobile, wherein the gear pulse information and the RF data are used to represent information of the wheel at approximately the same time.

S103, determining a rotation period of the wheel of the automobile from the gear pulse information of any one of the ABS sensors 30 of each wheel.

In the present embodiment, the electronic control unit 10 includes a tire pressure ECU 1011 and an ABS control unit 1012, and the rotation period of the wheels of the automobile can be calculated by the tire pressure ECU 1011 itself according to the gear pulse information collected by the ABS sensor, or calculated by the ABS control unit 1012 according to the gear pulse information collected by the ABS sensor, and then transmitted to the tire pressure ECU 1011 by the ABS control unit 1012.

Herein, the gear pulse information may specifically be a gear scale, and a rotation period of a wheel of the automobile may be calculated from the gear scale.

Specifically, the calculating the rotation period of the wheel of the automobile according to the gear pulse information includes: acquiring all gear scale information corresponding to a preset sampling depth, wherein the all gear scale information includes each collected gear scale and a sampling time corresponding to each gear scale; acquiring a currently collected gear scale and a first sampling time; according to the currently collected gear scale, querying the all gear scale information for a second sampling time corresponding to the same gear scale as the currently collected gear scale; and calculating the rotation period of the wheel according to the first sampling time and the second sampling time.

For example, the sampling depth may be 1 second, i.e., the total number of scales recorded in 1 second before the current time may be saved. Assuming that the scale detected at the current moment is 60, by tracing back the time point when the last scale is 60 according to the saved total number of scales, the rotation period can be calculated according to the time point obtained by querying and the current time according to the time point obtained by querying and the current time.

It is also possible to calculate the rotation angle of the automobile wheel from the gear pulse information. Specifically, the wheels typically have a total of 48 ABS gears, plus the clearance between the gears, which can be approximated as a total of 96 equally divided scales, each corresponding to an angle of 360/96=3.75 degrees. Therefore, after obtaining the current gear scale, the rotation angle of the automobile wheel can be calculated according to the corresponding angle of each scale and the current gear scale.

S104, judging whether a difference value between the rotation period of the tire pressure sensor and the rotation period of the automobile wheel is within a preset range.

Herein, the rotation period of the wheels of the automobile determined by the gear pulse information of any one of the ABS sensors of each wheel can be respectively compared with the rotation period of the tire pressure sensor so as to find the two ABS sensors of which the rotation period is within a preset range.

As can be appreciated, since the tire pressure sensor rotates integrally with the tire, the rotation period detected by the tire pressure sensor generally coincides with the rotation period of the automobile wheel calculated from the gear pulse information. However, when the automobile travels under poor road conditions such as a sand road surface, the generated acceleration noise may cause the rotation period measured by the tire pressure sensor to be not completely consistent with the rotation period calculated from the gear pulse information, and at this time, a certain error in the detection accuracy may be allowed. Therefore, the preset range corresponding to the difference value may be zero, namely, the rotation period of the tire pressure sensor is the same as the rotation period of the automobile wheel. The preset range corresponding to the difference value may also be greater than zero and less than 1, or greater than negative one and less than zero. Namely, there is an error between the rotation period of the tire pressure sensor and the rotation period of the automobile wheel. The error is a decimal number. It should be noted that the preset range may also be other parameter ranges, without limitation.

If the difference values between the two rotation periods are within the preset range, the following step S105 is performed. If the difference values of the above-mentioned two rotation periods are not within the preset range, the data detected this time may be discarded, and the above-mentioned steps S101 to S103 are re-executed to obtain a new rotation period parameter. Then it judges whether the difference value of the new rotation period parameter is within the preset range.

It should be noted that the ABS sensor mounted on the wheel and the ABS gear rotate integrally. Thus, theoretically, the period of one revolution of the gear measured by the ABS sensor or the wheel speed measured by the wheel speed sensor at this position is consistent with or has little deviation with the rotation period measured by the tire pressure sensor by an algorithm. However, the rotation period measured unilaterally by the tire pressure sensor may sometimes be erroneous. For example, road surface unevenness, rapid acceleration and deceleration, etc. result in that the gravitational acceleration component cannot form a sine wave; and then the position and rotation period measured by the measurement algorithm are biased. Therefore, step S104 is added in the present embodiment, and it is necessary to be considered as reliable data that the rotation period measured by the tire pressure sensor is approximately consistent with the rotation period measured by the automobile itself. Thereby, the accuracy of the measurement result is ensured, and it is prevented that the pulse counting is still performed in case the tire pressure sensor measurement algorithm fails or the measurement condition is not satisfied, resulting in positioning errors.

S105, determining a target ABS sensor mounted to the same wheel as the tire pressure sensor to determine the position of the same wheel based on the position of the target ABS sensor.

The target ABS sensor is one of the above-mentioned multiple ABS sensors; the gear pulse information is detected by the target ABS sensor; the automobile wheel rotation period is calculated according to the gear pulse information; and the calculated wheel rotation period is the same as or similar to the rotation period of the tire pressure sensor.

After determining the target ABS sensor corresponding to the wheel, the wheel is positioned according to the target ABS sensor.

Here, since the position of the wheel to which the tire pressure sensor is mounted is known in advance, after the target ABS sensor is determined from the tire pressure sensor, the corresponding wheel of the target ABS sensor can be known.

According to the above-mentioned method, the ABS sensor corresponding to each wheel of the automobile can be determined separately, and then the corresponding wheel of the automobile can be positioned according to the ABS sensor. If the automobile is also equipped with a spare tire, when the rotation period of the tire pressure sensor corresponding to the spare tire and the rotation period detected by any one of the ABS sensors cannot satisfy a preset condition, the spare tire can be located according to this feature.

In some embodiments, when it is detected that the difference between the rotation period of the tire pressure sensor and the rotation period of the automobile wheel satisfies the preset range, the result may be recorded. Then it is determined whether the number of times of receiving the RF data is greater than a preset threshold. If the number of times of receiving the RF data is not greater than the preset threshold, the above-mentioned steps S101 to S104 are performed again, and the determination results of two rotation periods are recorded. For example, if the difference satisfies the preset range, it is recorded as 1, otherwise, it is recorded as 0. Herein, the judgement result is recorded every time after the steps S101 to S104 are executed, until the number of times of receiving the RF data is greater than the preset threshold value, and the steps are stopped. At this time, the result of comparing two rotation periods is analyzed, a target ABS sensor mounted on the same wheel as the tire pressure sensor is determined according to the result, and the position of the same wheel is determined according to the position of the target ABS sensor.

For example, if the judgment results of two rotation periods indicate that the two meet the preset range with 1 and that the two do not meet the preset range with 0, the number of "1" s and the number of "0" s can be counted, the tire pressure sensor and the ABS sensor corresponding to the maximum number of "1" s can be obtained, and the tire pressure sensor and the ABS sensor can be bound, so that it can be determined that the tire pressure sensor and the ABS sensor are sensors located on the same wheel, and thus the wheel positioning can be performed via the ABS sensor.

Herein, the preset threshold value can be set by the system in advance according to experience. The electronic control unit records the number of times each time the RF data is received. When the number of times the RF data is received is greater, the gear pulse information of the automobile tire obtained by the ABS sensor is greater and the positioning accuracy of the tire is higher. On the contrary, when the number of times the RF data is received is less, the gear pulse information of the automobile tire obtained by the ABS sensor is less and the positioning accuracy of the tire is lower. However, the greater the number of times RF data is received, the longer it takes for wheel positioning, and correspondingly the greater the power consumption. Therefore, the preset threshold may be set in consideration of a combination.

In other embodiments, after the step S104 is performed, the gear pulse information satisfying the preset range of the rotation period difference value may also be recorded. After receiving N times of data and performing N times of rotation period comparison, a set of gear pulse information satisfying the preset range may be obtained. It determines whether the set of gear pulse information all approximately tend to a certain value. If so, a target ABS sensor mounted on the same wheel as the tire pressure sensor may be determined, thereby determining the position of the same wheel according to the position of the target ABS sensor. N is a positive integer. By multiple tests, the binding result of tire pressure sensor and ABS sensor can be more accurate, so that the final positioning result is more accurate.

Figure 5:
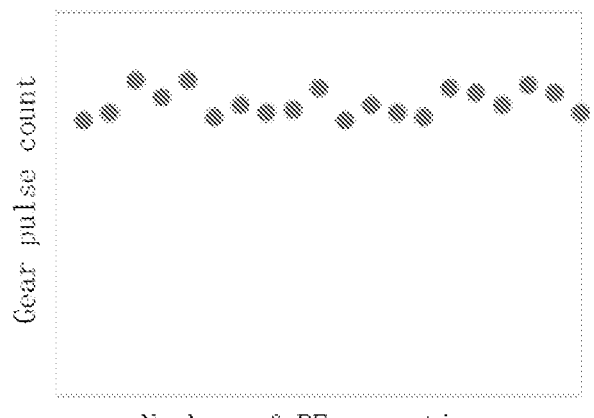
FIG. 5 is a schematic diagram showing the relationship between a gear pulse count and the number of RF receptions provided by an embodiment of the present application.

For example, as shown in FIG. 5, as the number of RF receptions increases, the number of data points in the figure gradually increases. The ordinate corresponding to each data point is the gear pulse count acquired by the ABS sensor, and the obtained gear pulse count gradually tends to a certain stable value. Therefore, it is known that the obtained gear pulse information of the automobile tire tends to be stable.

It will be appreciated that in a practical application scenario, there may be interference with the RF signal during transmission, resulting in the electronic control unit not being able to receive the data sent by the tire pressure sensor. Therefore, in some embodiments, the method further includes: when a data frame is lost in the received RF data, the obtained gear pulse information is synchronously matched according to the lost data frame, so that the time when the gear pulse information is obtained matches the time when the RF data is received. The method steps may be performed each time RF data is received to detect whether a data frame is lost from the received RF data.

Herein, in the data transmission process of the tire pressure sensor, each packet of RF data contains N frames of data, and a known fixed frame interval time T is used between each frame. When a frame loss occurs, the electronic control unit can perform reverse recovery according to the received frame number in the remaining frames and the frame interval time T, and perform synchronous matching by reading ABS data before the frame interval time T.

Figure 6A:
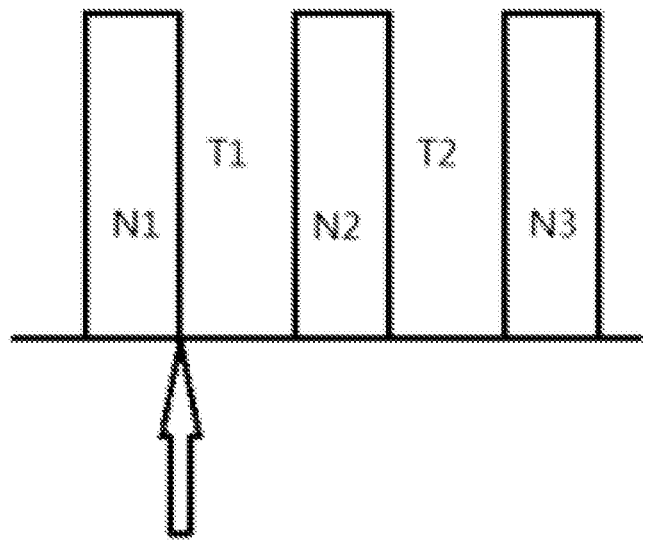
FIG. 6a is a schematic diagram of an RF data frame provided by an embodiment of the present application.
Figure 6B:
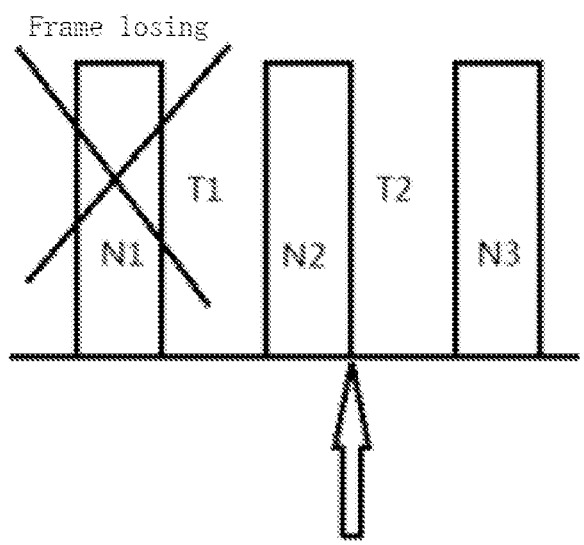
FIG. 6b is a schematic diagram of another RF data frame provided by an embodiment of the present application.

For example, as shown in FIGS. 6a and 6b, assuming that a packet of RF contains 3 frames of data, when a first frame in the RF data packet received by the electronic control unit is unable to be decoded due to interference, etc., the frame is judged to be lost; and when the electronic control unit receives a second frame (it can be judged that which frame is received by the frame number), the frame interval time of T1 is automatically subtracted, and the ABS gear data at the moment of N1 frames is read out for synchronous matching. Similarly, when frame losing appears in N1 and N2 transmission, the electronic control unit will automatically subtract the frame interval time of T1+T2 after receiving N3, and restore the ABS gear data at the time of N1 frame.

It is noted that an embodiment of the present application determines a target ABS sensor for wheel positioning according to a rotation period of a tire pressure sensor and a rotation period of an automobile wheel acquired in real time. In other embodiments, other methods may be employed to determine the target ABS sensor for wheel positioning. For example, a status flag, such as one indicating the success of the measurement, may be simply selected in place of the rotation period, and the electronic control unit may directly determine whether the measurement is valid based on the parameters of the status flag.

An embodiment of the present application provides a wheel positioning method by transmitting RF data when a tire pressure sensor rotates to a preset target angle, the RF data including a rotation period of the tire pressure sensor, determining a target ABS sensor located on the same wheel as the tire pressure sensor when the received rotation period of the tire pressure sensor is the same as the current rotation period of an automobile wheel, and then performing wheel positioning according to the target ABS sensor. In addition, frame loss prevention processing is also performed on the received RF data in the manner of a fixed frame interval and frame number, so as to ensure that the obtained RF data is accurate. This embodiment reduces tire position calibration thresholds, eliminates the need for additional mating tools, reduces automobile costs, and improves the accuracy of automobile wheel positioning.

Figure 7:
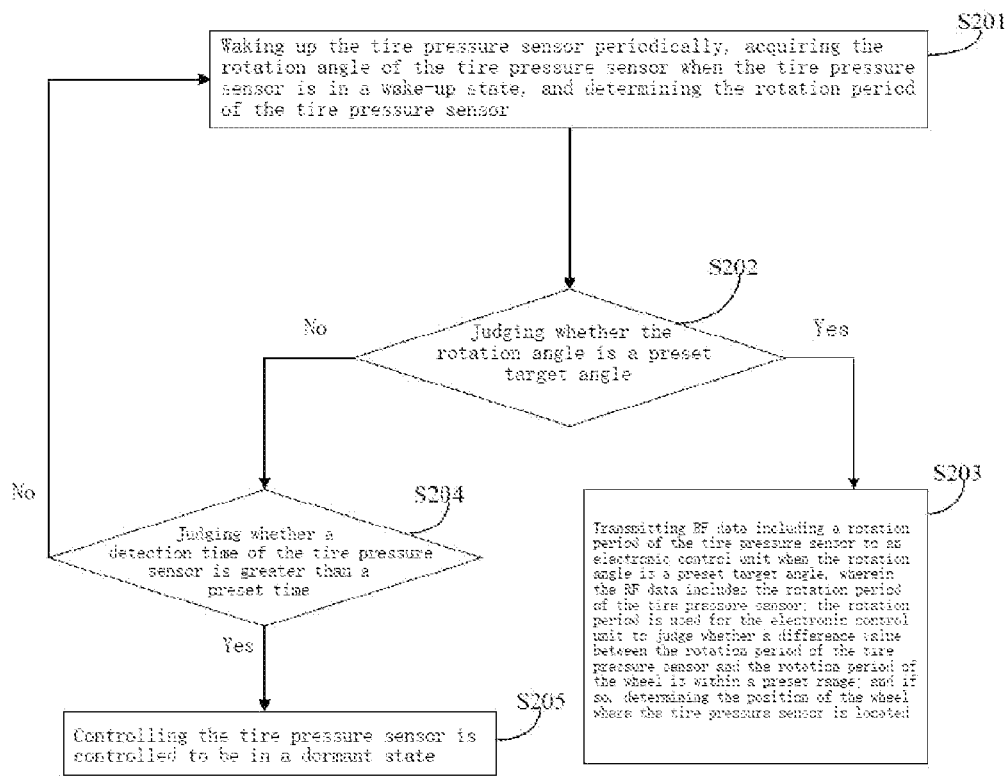
FIG. 7 is a flowchart of a wheel positioning method provided by another embodiment of the present application.

Reference to FIG. 7, it is a flowchart of a wheel positioning method provided by an embodiment of the present application. The method may be applied to the tire pressure sensor 20 described above, which may be provided on an automobile, such as the left front wheel, the right front wheel, the left rear wheel and the right rear wheel of the automobile, respectively. As shown in FIG. 7, the method includes:

S201, waking up the tire pressure sensor periodically, acquiring the rotation angle of the tire pressure sensor when the tire pressure sensor is in a wake-up state, and determining the rotation period of the tire pressure sensor.

The tire pressure sensor is provided with a timer, and the tire pressure sensor can be woken up periodically by the timer. The tire pressure sensor is further provided with an acceleration sensor. After waking up the tire pressure sensor, the acceleration change process of the gravity component can be collected by the acceleration sensor, and the current rotation angle of the tire pressure sensor is calculated after being processed according to a preset algorithm.

Herein, the acquiring a rotation angle of the tire pressure sensor includes:

obtaining the rotation angle of the tire pressure sensor according to a gravitational acceleration component of the tire pressure sensor in the X axis or the Z axis.

In this embodiment, the tangential acceleration and the normal acceleration to which the tire pressure sensor is subjected may be approximated as a constant value. During the automobile running at a constant speed, these two constant values are filtered out, namely, it can be seen that only the gravitational acceleration component changes in the X axis and Z axis, and the change process thereof is a sine wave, which is marked as X_Acc and Z_Acc respectively. For example, as shown in FIG. 8, it shows the change process of the gravitational acceleration component of the tire pressure sensor in the X-axis (X_Acc) and the Z-axis (Z_Acc). Taking the Z-axis acceleration speed Z_Acc as an example, the acceleration sampling point of point1 indicates that the tire pressure sensor is at the position of the tire Bottom (right below) at this time, point2 indicates Back (right rear), point3 indicates Top (right above), point4 indicates Front (right ahead), and point5 indicates Bottom (right below).

Figure 9:
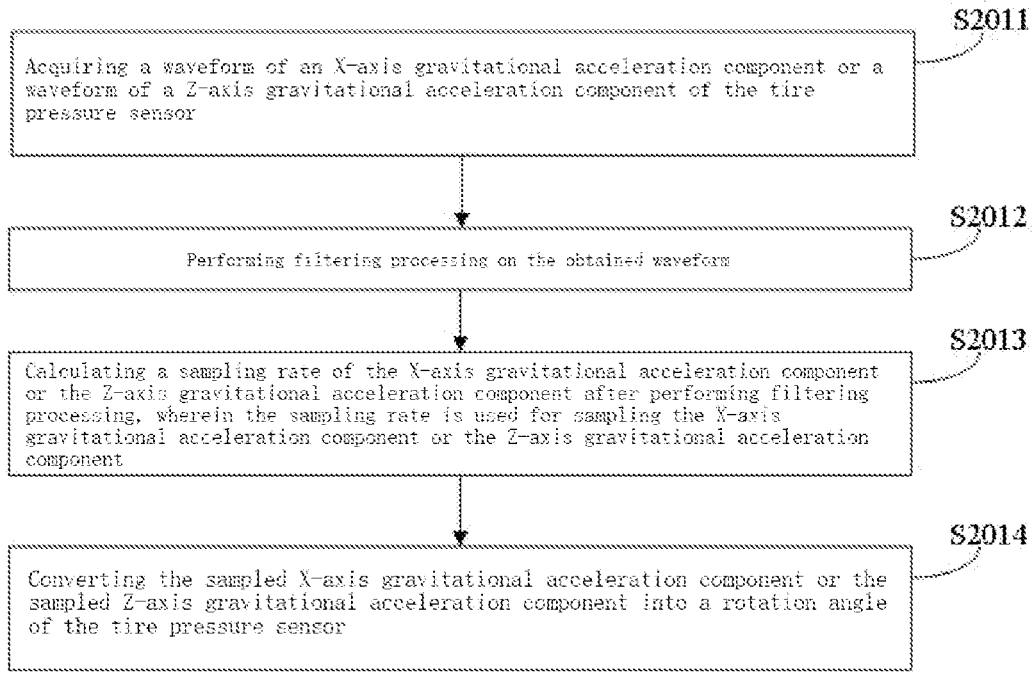
FIG. 9 is a flowchart of a method for obtaining a rotation angle of a tire pressure sensor in a wheel positioning method according to another embodiment of the present application.

Specifically, as shown in FIG. 9, the obtaining the rotation angle of the tire pressure sensor according to a gravitational acceleration component of the tire pressure sensor in the X axis or the Z axis includes:

S2011, acquiring a waveform of an X-axis gravitational acceleration component or a waveform of a Z-axis gravitational acceleration component of the tire pressure sensor.

Figure 10:
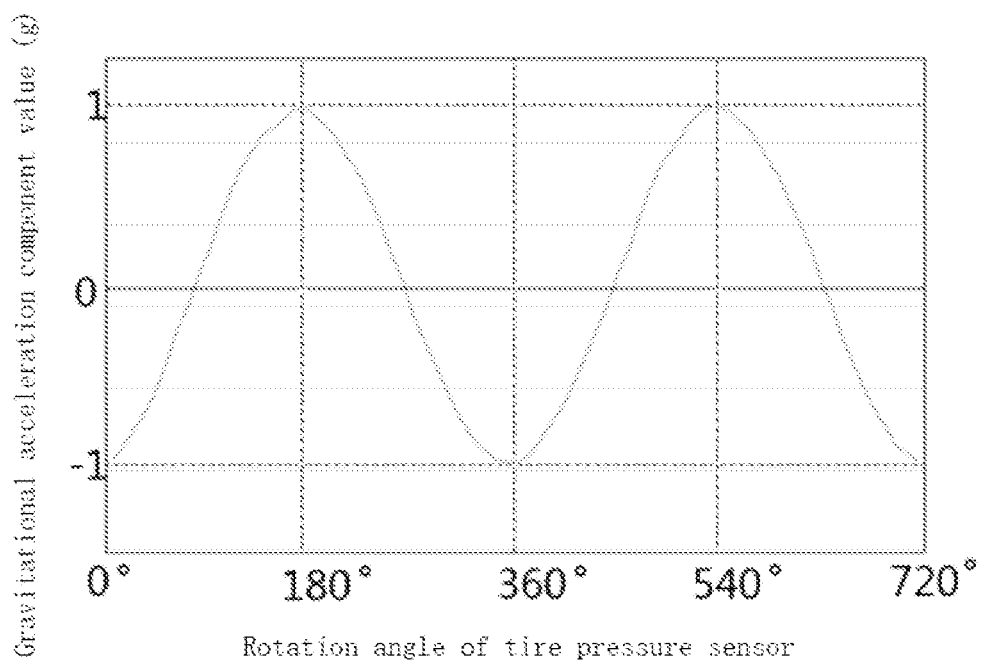
FIG. 10 is a schematic diagram showing the relationship between the rotation angle of the sensor and the gravitational acceleration component according to an embodiment of the present application.

For example, as shown in FIG. 10, taking the waveform of the X-axis gravitational acceleration component as an example, the rotation angle and the rotation period of the tire pressure sensor are calculated from the X-axis gravitational acceleration component.

S2012, performing filtering processing on the obtained waveform.

In a practical application scenario, the automobile may be affected by acceleration noise caused by ground friction, automobile vibration, etc. during running. Therefore, it is necessary to filter the gravitational acceleration component superimposed with the acceleration noise.

Specifically, the performing filtering processing on the obtained waveform includes: Step one, filtering out gravitational acceleration components that exceed upper and/or lower limits to obtain a filtered first waveform.

Step 2, performing small-amplitude acceleration noise filtering processing on the first waveform.

Figure 11:
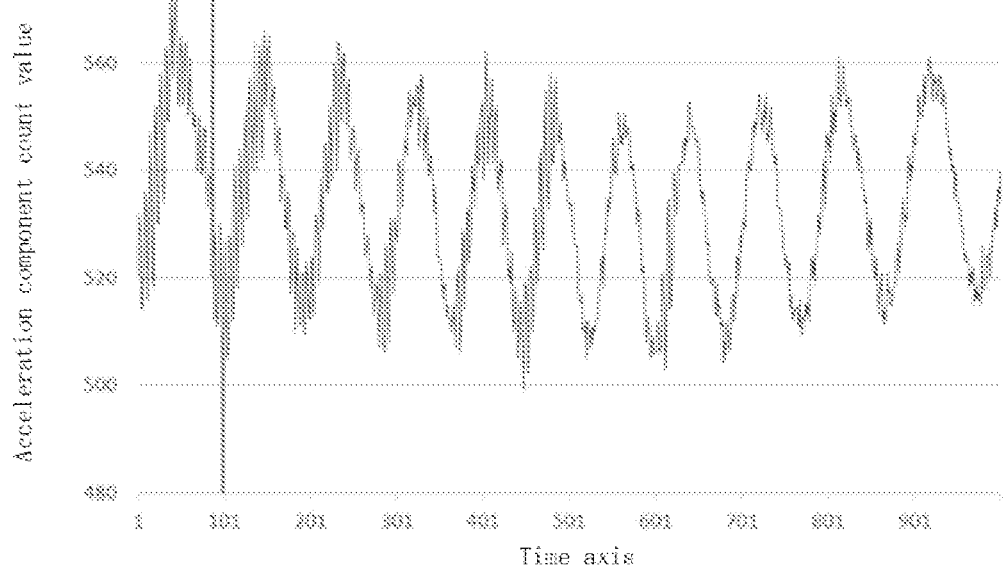
FIG. 11 is a waveform diagram of a first pre-filter gravitational acceleration component provided by an embodiment of the present application.

When the automobile passes through the uneven areas such as the deceleration strip and the sunken road, the automobile will generate a large instantaneous jitter, and this large amplitude of acceleration noise has a short duration and a large component value in the whole running process. For example, as shown in FIG. 11, it shows a waveform diagram of the acceleration component before first filtering. Thus, outliers that exceed the upper and/or lower limits may be "clip filtered" by filtering them as following processing algorithm:

$$if((Y_t > Y_{max}) \| (Y_t < Y_{min})) Y_t = Y_{t-1};$$

t: sampling time or number of sampling times; $Y_t$: an acceleration value acquired at a $t^{th}$ time; $Y_{t-1}$: an acceleration value acquired at a $(t-1)^{th}$ time; $Y_{max}$: an acceleration upper limit set by the algorithm; $Y_{min}$: an acceleration lower limit set by the algorithm.

Figure 12:
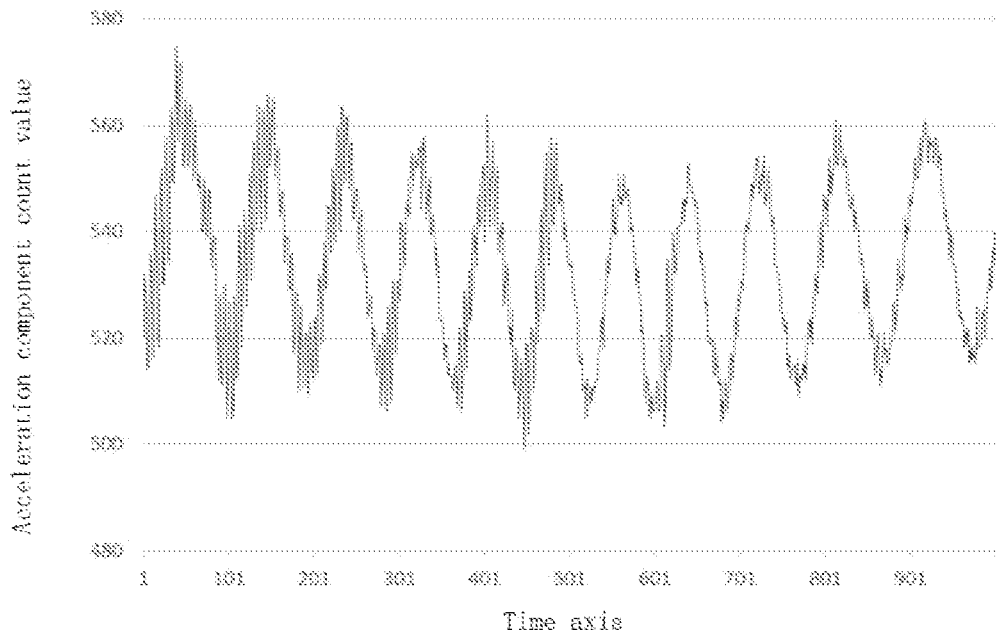
FIG. 12 is a waveform diagram of a first filtered gravitational acceleration component provided by an embodiment of the present application.

By performing clipping and filtering on the waveform of the gravitational acceleration component by the above-mentioned processing algorithm, the outliers exceeding the upper limit or/and the lower limit are filtered out, and a waveform diagram as shown in FIG. 12 can be obtained.

In addition, in order to conveniently map the variation trend of the gravitational acceleration component to the rotation angle of the tire pressure sensor, it is also necessary to filter the small amplitude of acceleration noise. Specifically, the "twice moving average filtering method" can be used to filter the small amplitude of acceleration noise, and the filtering algorithm is as follows:

$$M_t^{(1)} = \frac{Y_t + Y_{t-1} + \cdots + Y_{t-n+1}}{n}$$

$$M_t^{(2)} = \frac{M_t^{(1)} + M_{t-1}^{(1)} + \cdots + M_{t-n+1}^{(1)}}{n}$$

n: calculating the span of the moving average value; t: sampling time or number of times; $Y_t$: an acceleration value acquired at a $t^{th}$ time; $Y_{t-1}$: an acceleration value acquired at a $(t-1)^{th}$ time; $M_t^{(1)}$: once moving average value at a $t^{th}$ time; $M_t^{(2)}$: twice moving average value at a $t^{th}$ time.

Figure 13:
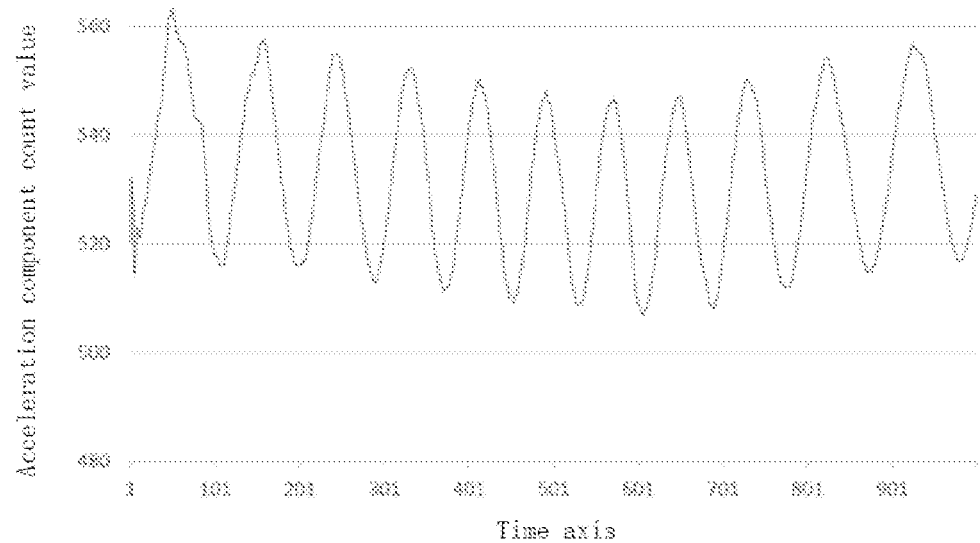
FIG. 13 is a waveform diagram of a second filtered gravitational acceleration component provided by an embodiment of the present application.

As shown in FIG. 13, a relatively smooth waveform can be obtained by processing the above-mentioned amplitude-limited filtered gravitational acceleration component according to the above-mentioned small amplitude of acceleration noise filtering processing algorithm.

The smoothed waveform is then sampled to calculate an appropriate sampling rate so as to sample the acceleration component.

S2013, calculating a sampling rate of the X-axis gravitational acceleration component or the Z-axis gravitational acceleration component after performing filtering processing, wherein the sampling rate is used for sampling the X-axis gravitational acceleration component or the Z-axis gravitational acceleration component.

The sampling rate of the X-axis gravitational acceleration component or the Z-axis gravitational acceleration component after filtering processing can be calculated according to the following formula: fsample=360°/(a*Tcircle), where fsample is a sampling rate, a is an angle measurement accuracy, i.e. the maximum angular deviation value allowed for measurement, and Tcircle is a wheel rotation period.

The value of a may be set in advance. For example a=300, and the number of points to be sampled for one revolution of the tire is X=3600/300=12, and the time required to sample a point is T=Tcircle/x, i.e. the sampling rate is fsample=1/T=x/Tcircle=360°/(a*Tcircle)=12/Tcircle. Herein, x is the number of sampling points per revolution, and T is the time required to sample a point.

Figure 14:
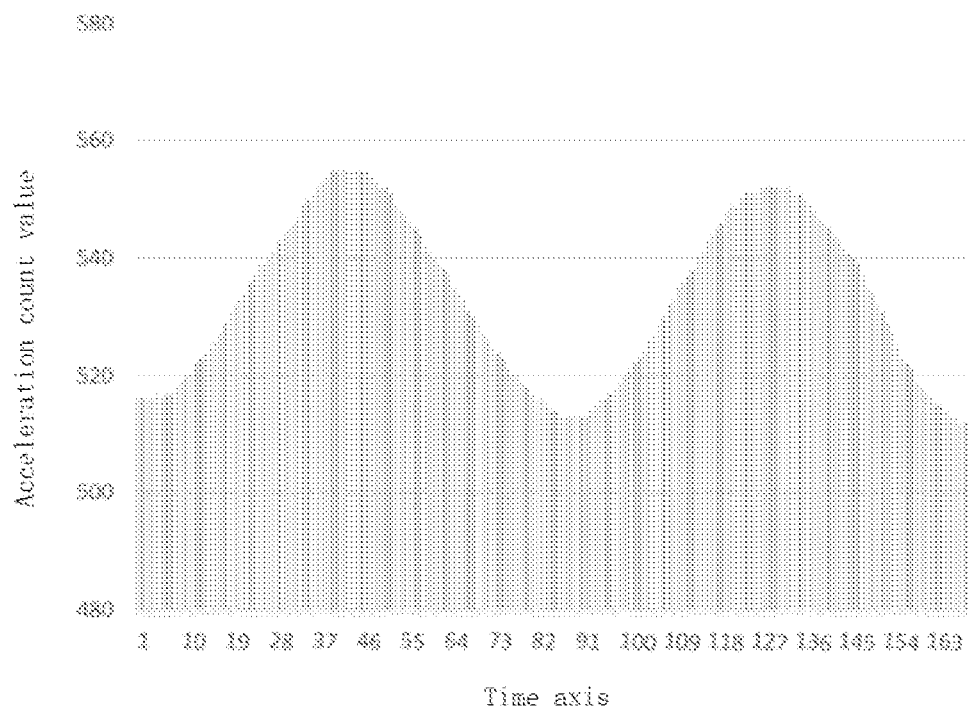
FIG. 14 is a schematic diagram of a gravitational acceleration component at a high sampling rate provided by an embodiment of the present application.
Figure 15:
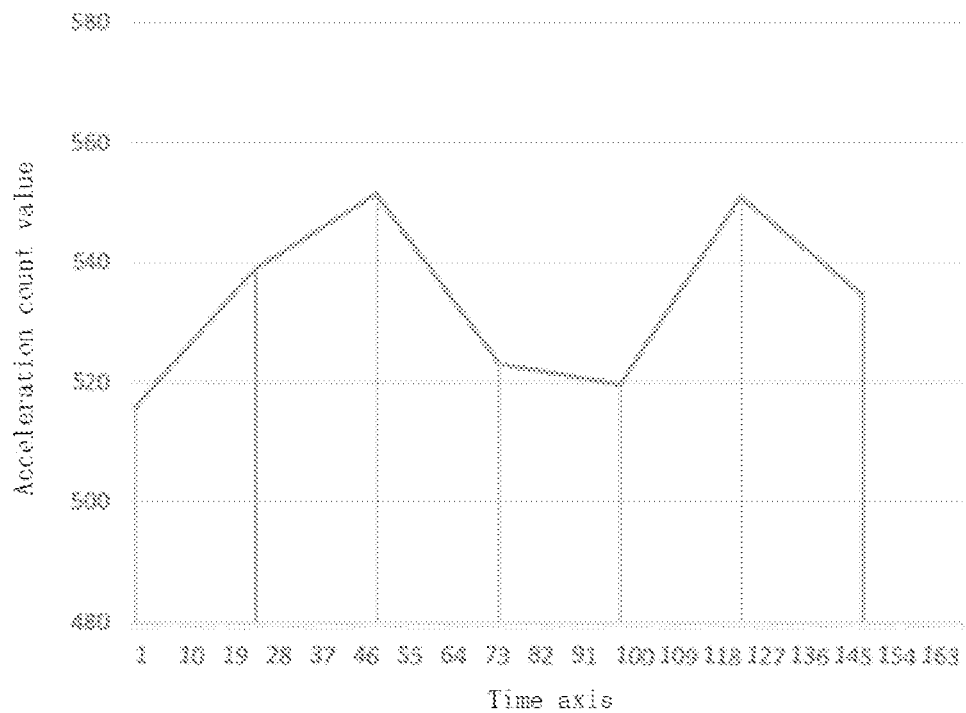
FIG. 15 is a schematic diagram of a gravitational acceleration component at a low sampling rate provided by an embodiment of the present application.

It can be understood that when the sampling rate is set to be high (for example, as shown in FIG. 14), the number of collected points increases, so that the original waveform can be restored more realistically. However, the storage and data processing expense of the single chip microcomputer is also increased. When the sampling rate is set low (e.g. as shown in FIG. 15), the number of points collected decreases, but waveform distortion is also caused thereby. The detection accuracy decreases. Therefore, it is important to choose the appropriate sampling rate.

In this embodiment, the sampling rate may be matched to the real-time speed of the automobile to determine the appropriate sampling rate. Specifically, the method further includes: first, real-time parameters of the automobile tire are obtained, the real-time parameters including acceleration, rotation period, tire rotation speed, etc. Then the sampling rate is adjusted according to the real-time parameter. For example, current acceleration information about the automobile can be collected in real time, and an appropriate sampling rate is selected based on the acceleration, wherein the acceleration can be a centripetal acceleration. The centripetal acceleration formula is $$Acc = \frac{4\pi^2 R}{Tcircle^2}.$$

If it can be derived that $$Tcircle = 2\pi \sqrt{\frac{R}{ACC}},$$

the sampling rate is $$fsample = \frac{360°}{a * Tcircle} = \frac{360°}{2\pi * a} \sqrt{\frac{Acc}{R}};$$

where Acc is the centripetal acceleration, R is the radius of the tire, Tcircle is the rotation period of the tire, and the sampling rate fsample can be dynamically adjusted according to the centripetal acceleration. Finally, the rotation angle of the tire pressure sensor is acquired according to the adjusted sampling rate.

In addition to obtaining the sampling rate by the above method, other methods may be used to obtain the sampling rate. In some embodiments, power consumption and test efficiency issues are considered, and the single sampling time may be short (typically done in 2 S) when the automobile speed is above a certain threshold (e.g., at 40 Km/h). It can be approximately considered that the speed will not change dramatically in a short time. Therefore, according to practical applications, for example, before detecting the rotation angle, current acceleration information is collected, and then the initial setting is performed as the above sampling rate formula according to the current acceleration. During the detection, a constant sampling rate is used for detection.

S2014, converting the sampled X-axis gravitational acceleration component or the sampled Z-axis gravitational acceleration component into a rotation angle of the tire pressure sensor.

Herein, a rotation angle corresponding to the X-axis gravitational acceleration component or the Z-axis gravitational acceleration component, respectively, can be obtained with reference to FIG. 8.

The determining a rotation period of the tire pressure sensor includes:

calculating a rotation period of the tire pressure sensor according to a formula $$T = 2\pi\sqrt{\frac{R}{Acc}},$$

wherein T is the rotation period of the tire pressure sensor, R is a wheel radius, and Acc is a centripetal acceleration detected by the tire pressure sensor; or determining a detection time point when the rotation angle of the tire pressure sensor is 0 degrees and a detection time point corresponding to 360 degrees when the tire pressure sensor rotates from 0 degrees to 360 degrees, and calculating the rotation period of the tire pressure sensor according to the detection time point corresponding to 0 degrees and the detection time point corresponding to 360 degrees.

The detailed process of calculating the rotation period of the tire pressure sensor may refer to the above-described embodiment, and will not be described in detail herein.

After obtaining the rotation angle of the tire pressure sensor by the above method, it is further determined whether the rotation angle is a preset target angle. The RF data is generated by the tire pressure sensor only when the preset target angle is reached.

S202, judging whether the rotation angle is a preset target angle. The preset target angle may be any angle without limitation. If the rotation angle is the preset target angle, the following step S203 is executed; if the rotation angle is not the preset target angle, the following step S204 is executed.

S203, transmitting RF data including a rotation period of the tire pressure sensor to an electronic control unit when the rotation angle is a preset target angle, wherein the RF data includes the rotation period of the tire pressure sensor; the rotation period is used for the electronic control unit to judge whether a difference value between the rotation period of the tire pressure sensor and the rotation period of the wheel is within a preset range; and if the difference value is within a preset range, determining the position of the wheel where the tire pressure sensor is located.

Herein, the detailed process of the electronic control unit determining whether the difference value between the rotation period and the rotation period of the wheel is within a preset range, and the detailed process of determining the position of the wheel where the tire pressure sensor is located may refer to the above-described embodiments.

S204, judging whether a detection time of the tire pressure sensor is greater than a preset time. If the detection time of the tire pressure sensor is not greater than the preset time, it skips to execute the above-mentioned step S201; if the detection time of the tire pressure sensor is greater than the preset time, the following step S205 is executed.

S205, the tire pressure sensor is controlled to be in a dormant state.

Herein, if the rotation angle of the tire pressure sensor has not reached the preset target angle within a preset time, the tire pressure sensor performs a dormant state. After the tire pressure sensor wakes up next time, the above-mentioned method steps are continued to detect the rotation angle.

An embodiment of the present application provides a wheel positioning method that can be applied to a tire pressure sensor. The method includes acquiring a rotation angle of the tire pressure sensor, and when the rotation angle is a preset target angle, transiting by the tire pressure sensor the RF data to the electronic control unit, so that the electronic control unit positions an automobile tire according to the RF data. This embodiment reduces tire position calibration thresholds, eliminates the need for additional mating tools, reduces automobile costs, and improves the accuracy of wheel positioning.

Figure 16:
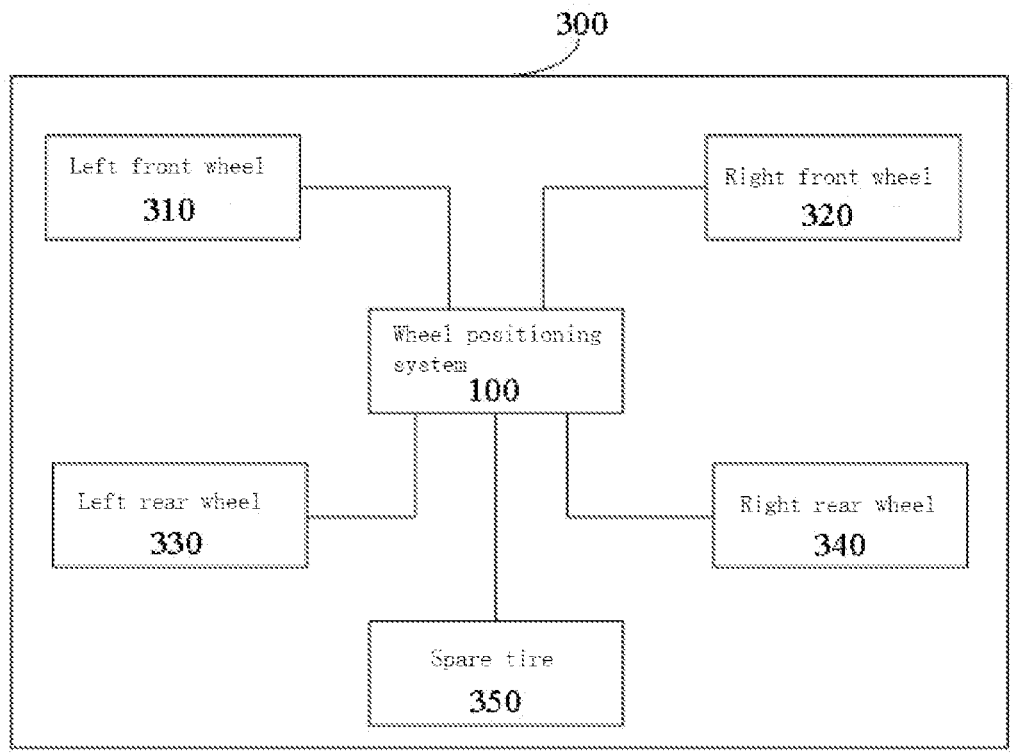
FIG. 16 is a structurally schematic diagram of an automobile according to an embodiment of the present application.

Referring to FIG. 16, it is a structurally schematic diagram of an automobile according to an embodiment of the present application. As shown in FIG. 16, the automobile 300 includes the wheel positioning system 100, the left front wheel 310, the right front wheel 320, the left rear wheel 330, the right rear wheel 340, and the spare tire 350 described by the above embodiments.

Herein, the automobile 300 can perform tire position positioning on the left front wheel 310, the right front wheel 320, the left rear wheel 330, the right rear wheel 340, and the spare tire 350 by the wheel positioning system 100.

The automobile 300 may be various types of automobiles, for example, passenger cars, commercial cars, etc. Embodiments of the present application provide an automobile that does not require additional tools for wheel positioning, has the advantages of low operational thresholds and low cost, and provides reliable and accurate wheel positioning results.

Finally, it should be noted that the above embodiments are merely illustrative of the technical solutions of the present application, rather than limiting it. Combinations of features in the above embodiments or in different embodiments are also possible within the spirit of the application. The steps can be implemented in any order, and there are many other variations of the different aspects of the application described above, which are not provided in detail for the sake of brevity. Although the application has been described in detail with reference to the foregoing embodiments, those skilled in the art will appreciate that the technical solutions of the each above-mentioned embodiment can still be modified, or some of the technical features thereof can be equivalently substituted; and such modifications and substitutions will not cause the essence of the corresponding technical solutions to depart from the scope of the embodiments of the application.

The invention claimed is:

1. A wheel positioning method applied to an electronic control unit mounted to an automobile, each wheel of which is provided with a tire pressure sensor and an anti-lock braking system (ABS) sensor, wherein the method comprises steps of:

receiving radio frequency (RFJ data from a tire pressure sensor, wherein the RF data is transmitted when a rotation angle of the tire pressure sensor is at a target angle, and the RF data comprises a rotation period of the tire pressure sensor;

acquiring gear pulse information transmitted by the ABS sensor of each wheel of the automobile, wherein the gear pulse information and the RF data are used to represent information of the wheel at approximately the same time;

determining a rotation period of the wheel of the automobile from the gear pulse information of any one of the ABS sensors of each wheel;

judging whether a difference value between the rotation period of the tire pressure sensor and the rotation period of the automobile wheel is within a preset range; and if the difference value between the rotation period of the tire pressure sensor and the rotation period of the automobile wheel is within the preset range, binding, by the electronic control unit, the tire pressure sensor and a target ABS sensor mounted to the same wheel as the tire pressure sensor to determine the position of the same wheel based on the position of the target ABS sensor.

2. The method according to claim 1, wherein the electronic control unit comprises a tire pressure electronic control unit (ECU) and an ABS control unit; the ABS control unit is connected to the tire pressure ECU and the ABS sensor, respectively; and the step of determining a rotation period of the wheel of the automobile from the gear pulse information of any one of the ABS sensors of each wheel comprises:

acquiring a rotation period of the wheel of the automobile by the ABS control unit, wherein the rotation period of the wheel is calculated by the ABS control unit based on the gear pulse information of any one of the ABS sensors of each wheel; or acquiring by the tire pressure ECU the gear pulse information of any one of the ABS sensors of each wheel via the ABS control unit, and calculating the rotation period of the wheel of the automobile according to the gear pulse information.

3. The method according to claim 2, wherein the gear pulse information comprises a gear scale, and the step of calculating the rotation period of the wheel of the automobile according to the gear pulse information comprises:

acquiring all gear scale information corresponding to a preset sampling depth, wherein the all gear scale information includes each collected gear scale and a sampling time corresponding to each gear scale;

acquiring a currently collected gear scale and a first sampling time;

according to the currently collected gear scale, querying the all gear scale information for a second sampling time corresponding to the same gear scale as the currently collected gear scale; and calculating the rotation period of the wheel according to the first sampling time and the second sampling time.

4. The method according to claim 1, wherein the judging whether a difference value between the rotation period of the tire pressure sensor and the rotation period of the automobile wheel is within a preset range comprises:

when the difference value between the rotation period of the tire pressure sensor and the rotation period of the automobile wheel is zero, determining it to be within the preset range, otherwise, not within the preset range.

5. The method according to claim 1, wherein the method further comprises:

when a data frame is lost in the received RF data, synchronously matching the obtained gear pulse information according to the lost data frame, so that the time when the gear pulse information is obtained matches the time when the RF data is received.

6. A wheel positioning method applied to a tire pressure sensor, the method comprising:

waking up the tire pressure sensor periodically, and acquiring a rotation angle of the tire pressure sensor when the tire pressure sensor is in a wake-up state;

determining a rotation period of the tire pressure sensor;

transmitting RF data including a rotation period of the tire pressure sensor to an electronic control unit when the rotation angle is a preset target angle, wherein the RF data comprises the rotation period of the tire pressure sensor; the rotation period is used for the electronic control unit to judge whether a difference value between the rotation period of the tire pressure sensor and the rotation period of the wheel is within a preset range; and if the difference value between the rotation period of the tire pressure sensor and the rotation period of the wheel is within a preset range, determining the position of the wheel where the tire pressure sensor is located.

7. The method according to claim 6, wherein the determining a rotation period of the tire pressure sensor comprises steps of:

calculating a rotation period of the tire pressure sensor according to a formula $$T = 2\pi\sqrt{\frac{R}{Acc}},$$

wherein T is the rotation period of the tire pressure sensor, R is a wheel radius, and Acc is a centripetal acceleration detected by the tire pressure sensor; or determining a detection time point when the rotation angle of the tire pressure sensor is 0 degrees and a detection time point corresponding to 360 degrees when the tire pressure sensor rotates from 0 degrees to 360 degrees, and calculating the rotation period of the tire pressure sensor according to the detection time point corresponding to 0 degrees and the detection time point corresponding to 360 degrees.

8. The method according to claim 6, wherein the step of acquiring the rotation angle of the tire pressure sensor comprises:

obtaining the rotation angle of the tire pressure sensor according to a gravitational acceleration component of the tire pressure sensor in the X axis or the Z axis.

9. The method according to claim 8, wherein the step of obtaining the rotation angle of the tire pressure sensor according to a gravitational acceleration component of the tire pressure sensor in the X axis or the Z axis comprises:

acquiring a waveform of an X-axis gravitational acceleration component or a waveform of a Z-axis gravitational acceleration component of the tire pressure sensor;

performing filtering processing on the obtained waveform;

calculating a sampling rate of the X-axis gravitational acceleration component or the Z-axis gravitational acceleration component after performing filtering processing, wherein the sampling rate is used for sampling the X-axis gravitational acceleration component or the Z-axis gravitational acceleration component; and converting the sampled X-axis gravitational acceleration component or the sampled Z-axis gravitational acceleration component into a rotation angle of the tire pressure sensor.

10. The method according to claim 9, wherein the step of performing filtering processing on the obtained waveform comprises:
  filtering out gravitational acceleration components that exceed upper and/or lower limits to obtain a filtered first waveform; and
  performing small-amplitude acceleration noise filtering processing on the first waveform.

11. The method according to claim 9, wherein the step of calculating a sampling rate of the X-axis gravitational acceleration component or the Z-axis gravitational acceleration component after performing filtering processing comprises:
  calculating a sampling rate of the X-axis gravitational acceleration component or the Z-axis gravitational acceleration component according to a formula: fsample=360°/(a*Tcircle), wherein fsample is a sampling rate, a is a maximum angular deviation value allowed for measurement, and Tcircle is a wheel rotation period.

12. The method according to claim 9, wherein the method further comprises:
  acquiring real-time parameters of the automobile tire;
  adjusting the sampling rate according to the real-time parameter; and
  acquiring a rotation angle of the tire pressure sensor according to the adjusted sampling rate.

13. The method according to claim 6, wherein the method further comprises:
  judging whether a detection time of the tire pressure sensor is greater than a preset time when the rotation angle is not the preset target angle;
  if the detection time of the tire pressure sensor is not greater than the preset time, executing the step of acquiring the rotation angle of the tire pressure sensor again; and
  if the detection time of the tire pressure sensor is greater than the preset time, controlling the tire pressure sensor to be in a dormant state.

14. A wheel positioning system, comprising: an electronic control unit, a tire pressure sensor and an anti-lock braking system (ABS) sensor, wherein the electronic control unit is respectively connected to the tire pressure sensor and the ABS sensor;
  the electronic control unit is configured for:
  receiving RF data transmitted by the tire pressure sensor, the RF data including a rotation period of the tire pressure sensor; acquiring gear pulse information transmitted by the ABS sensor;
  determining a rotation period of an automobile wheel according to the gear pulse information;
  determining whether a difference value between a rotation period of the tire pressure sensor and the rotation period of the automobile wheel is within a preset range;
  if the difference value between a rotation period of the tire pressure sensor and the rotation period of the automobile wheel is within the preset range, binding, by the electronic control unit, the tire pressure sensor and a target ABS sensor mounted to the same wheel as the tire pressure sensor to determine the position of the same wheel based on the position of the target ABS sensor;
  the tire pressure sensor is configured for:
  waking up the tire pressure sensor periodically, and acquiring a rotation angle of the tire pressure sensor when the tire pressure sensor is in a wake-up state;
  judging whether the rotation angle is a preset target angle;
  if the rotation angle is the preset target angle, transmitting RF data to the electronic control unit, wherein the RF data includes the rotation period of the tire pressure sensor;
  the ABS sensor is configured for:
  acquiring gear pulse information of the automobile wheel, and transmitting the gear pulse information to the electronic control unit.

* * * * *